C. H. NICHOLSON.
TEST INDICATOR.
APPLICATION FILED JULY 23, 1921.
1,399,314.
Patented Dec. 6, 1921.
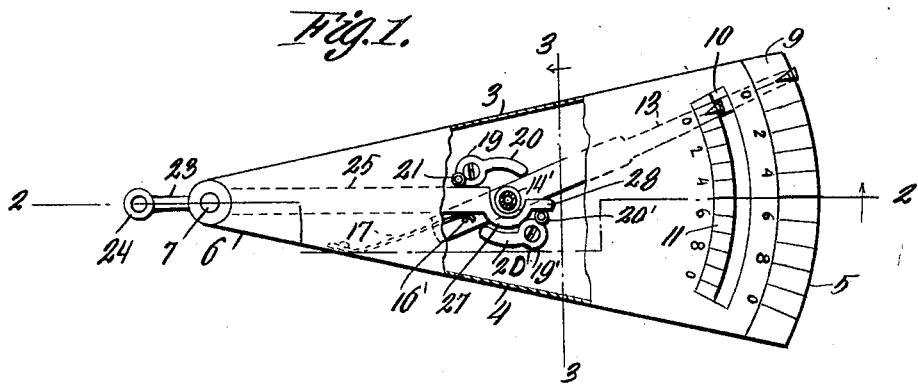
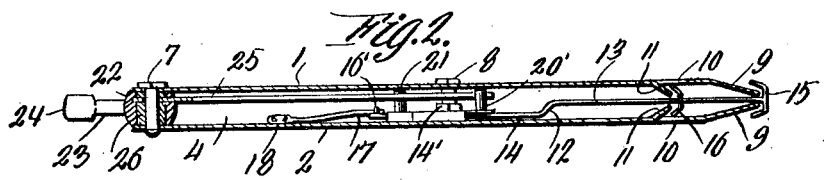
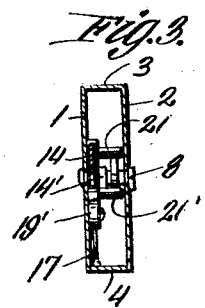
CHARLES H. NICHOLSON INVENTOR.
WITNESSES
BY
ATTORNEY.

UNITED STATES PATENT OFFICE.

CHARLES H. NICHOLSON, OF BROOKLYN, NEW YORK.

TEST-INDICATOR.

1,399,314. Specification of Letters Patent. Patented Dec. 6, 1921.

Application filed July 23, 1921. Serial No. 487,045.

*To all whom it may concern:*

Be it known that I, CHARLES H. NICHOLSON, a citizen of the United States, residing at Brooklyn, New York, in the county of Kings and State of New York, have invented certain new and useful Improvements in Test-Indicators, of which the following is a specification.

This invention relates to indicating gages for testing work and provides a test indicator of novel design and actions enabling the slightest inaccuracy of the work to be instantly indicated, thereby enabling the prompt correction of the error.

An additional object is to provide a test indicator from either side of which a double reading may be obtained, dials being provided on each face for coöperation with an indicating element whereby the amount of the inaccuracy in the work may be estimated.

A further and very important object of the invention is the construction of a work testing indicator whereby when the ball point of the said indicator comes in contact with a piece of milled work, for instance, to be tested, the indicator hand will be correspondingly moved so that the inaccuracy of the said work may be determined.

With the above and other objects in view the invention may be said to reside generally in the details of construction, combination and arrangement of parts as will be hereinafter more fully pointed out and described, reference being had to the accompanying drawings, wherein, Figure 1 is a side view of the test indicator, a part being broken away to disclose the inner mechanism of the device. Fig. 2, a longitudinal cross section taken on a horizontal plane as indicated by lines 2—2 of Fig. 1, and Fig. 3, a vertical cross section taken on line 3—3 of Fig. 1.

The mechanism of the indicator is contained within a triangular spaced casing which incloses the same on the top, bottom and sides as illustrated, numeral 1 indicating the top or cover plate of the casing the bottom frame or plate being bent upwardly at the sides to provide supporting flanges for the cover plate, the latter being attached thereto in any suitable manner. The casing thus tapers from the widest or butt end 5 to the point or nose 6. The top and bottom plates are connected relatively in spaced relation by means of spacing screws or fasteners 7 and 8, respectively located at the center and adjacent to nose of the indicator. These screws also provide the axis for certain of the movable parts. The butt ends of the upper and lower cover of the casing are beveled as indicated at 9 and these bevels are preferably formed by inclining the ends of plates 1 and 2 inwardly as shown to advantage in Fig. 2 of the drawing. Each bevel is provided upon its outer surface with graduations as indicated in Fig. 1. At a point inwardly of the graduated bevel the casing is slotted on both sides as indicated at 10, the slots extending in parallel arcuate formation with the bevel-scale. That portion of each plate adjacent the inner longitudinal edge of each slot is bent inwardly at an angle with the plane of the casing to provide scale flanges 11 as will likewise be seen from referring to sectional view in Fig. 2. These scale flanges are marked with graduations in the same manner as the outer or companion bevel scale 9. Both upper and lower plates of the casing are similarly arranged so it will seem that a double reading may be had from each side of the indicator.

The indicating hand which coöperates with the scales in furnishing the readings thereof, is inclosed within the hollow casing and comprises a long strip or bar bent inwardly of its ends as shown at 12, so that the opposite end portions are relatively offset. This offset enables the hand or indicating portion 13 to project centrally between the upper and the lower plates of the casing while the rear or shank portion 14 is disposed adjacent one of the side plates as illustrated. The hand portion extends centrally between the inwardly directed scale flanges 11 and passes outwardly of the casing at the butt end 5. At its exterior end the hand is provided with a double pointer-head 15 giving pointers projecting rearwardly over the beveled scales 9, thus providing pointers for both sides of the casing. A similar double pointer member 16 is provided on the hand for coöperation with scale flanges 11, the pointed ends of this member working along the scales as shown to advantage in Fig. 1 of the drawing. The shank 14 of the indicating hand pivots on screw 8 and is provided with a bushing 14', encircling the screw to provide a firm bearing for the indicating member. The outer end 7 of the shank is provided with a laterally projecting pin 16' against which rests one end of the flat spring 17, the other end of the spring being fastened to a side of the casing as is shown at 18. This spring is normally tensioned to hold the pointers at the zero end of the scales, consequently any advance of the pointers along the graduation is against the tensions of the spring. On opposite sides of the axis or screw about which the indicating member revolves are pivoted reversibly positioned dogs 19 and 19' having forwardly projecting fingers 20 and 20' respectively adapted to engage and bear against one edge of shank 14 for moving the indicating member about its pivot. Each dog is also provided with a laterally projecting pin 21 and 21' adapted to be engaged by the central lever of the friction end or work engaging member.

The work engaging member is shown with an enlarged circular hub 22 which is mounted to revolve on the shank of screw 7 at the nose of the casing and between the upper and lower plates. This hub is provided with a forwardly projecting neck-portion 23 terminating in a work-engaging knob 24 which is adapted to rest against the surface of the work to be tested. One end of a long lever 25 fits in a socket in the hub and is held firm by means of a bushing 26 through which screw 7 extends. Consequently lever 25 swings in an arc as hub 22 rotates about its axis. The outer end of lever 25 is provided with a cut out portion 27 into which the shank of screw 8 is received to permit of sufficient movement of the lever past the screw for engagement with pin 21 of dog 19. At one terminal of the cut-out a finger 28 is provided and this finger is adapted to engage pin 20' of dog 19'. It is to be noted that the positions of the dogs are reversed so that they operate against the indicating member of opposite sides of pivot screw 8.

When using the device in testing the accuracy of work, the same is so placed that the knob 24 of the work engaging member is in contact with the surface to be tested. As the work passes under the knob, any deviation or inaccuracy in the diameter of the work will be immediately indicated on the scales at the end of the casing, since the knob will rise and fall as the diameter of the work increases or decreases. When the knob is moved to either side of the axis or screw 7, the central lever 25 will be simultaneously adjusted against the pins of the dog on the opposite side, which dog is thus actuated to press against shank 14 of the indicating member, causing the latter to pivot about axis 8 for shifting the indicating points 15 and 16 over to a graduation on the scales which indicates the extent of the variation and, of course, the extent of inaccuracy in the work. As scales are provided on both sides of the casing, a reading may be had from either side by reason of the reversed position of the dogs it will be seen that the indicating hand is correspondingly adjusted to indicate a proper reading on the scales regardless of whether the work engaging knob 24 is moved to one side or the other of this pivot. When not in use, the parts of the indicator are returned to normal positions by reaction of spring 17, the pressure of which returns the hand to zero position.

The foregoing description and accompanying drawings have reference to what might be considered to be the approved or preferred form of my invention. I desire it to be understood, however that I may make such changes in the construction, combination and arrangement of parts, materials, dimensions, et cetera, as may prove expedient and fall within the scope of the appended claims.

Having thus described my invention, what I claim as new and desire to secure by Letters Patent is:—

1. A test indicator of the character specified comprising a pivoted indicating hand, dogs on opposite sides of the hand and engageable therewith on opposite sides of the pivot, and work engaging means coöperating with either of said dogs for operating said indicating hand.

2. A test indicator of the character specified comprising a pivotally supported indicating hand reversibly positioned dogs on opposite sides of the hand engageable therewith on opposite sides of the pivot, and a pivoted work engaging member adapted for coöperating with either of said dogs for turning the hand about its pivot.

3. A test indicator of the character specified comprising scale means, a pivotally supported indicating hand arranged for coöperation with the scale means, reversible dogs on opposite sides of the pivoted hand for reversing the movement of same about its axis, and a pivoted work engaging member adapted for actuating either of said dogs for transmitting movement to the indicating hand.

4. A test indicator of the character specified comprising a longitudinally tapered casing, having a scale at the widest end, an indicating member having one end pivotally supported centrally of the casing and its other end provided with a pointer for coöperation with the scale end, a work engaging member pivotally supported at the opposite end of the casing and operating dogs pivoted to the casing on opposite sides of the pivoted end of the indicating member, said dog being off set relative to the axis of the member, and pin means provided on said dogs and adapted to be alternately engaged by the work engaging means for bringing said dogs into engagement with the indicating member whereby the scale-pointer means of the latter may be advanced along the scale means.

In testimony whereof I affix my signature in presence of two witnesses.

CHARLES H. NICHOLSON.

Witnesses:
EDWIN ANDERSON,
G. M. KASEMAN.